(12) United States Patent
Baker (10) Patent No.: US 10,885,470 B2
(45) Date of Patent: Jan. 5, 2021

(54) SELECTIVE TRAINING FOR DECORRELATION OF ERRORS

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 256 days.

(21) Appl. No.: 16/097,539

(22) PCT Filed: Jun. 22, 2018

(86) PCT No.: PCT/US2018/039007
§ 371 (c)(1),
(2) Date: Oct. 29, 2018

(87) PCT Pub. No.: WO2019/005611
PCT Pub. Date: Jan. 3, 2019

(65) Prior Publication Data
US 2020/0327455 A1    Oct. 15, 2020

Related U.S. Application Data (60) Provisional application No. 62/524,686, filed on Jun. 26, 2017.

(51) Int. Cl.
*G06N 20/20* (2019.01)
*G06F 16/28* (2019.01)

(52) U.S. Cl.
CPC ........... *G06N 20/20* (2019.01); *G06F 16/285* (2019.01)

(58) Field of Classification Search
CPC ........ G06N 20/20; G06N 3/084; G06N 3/082; G06N 3/0454; G06F 16/285; G06T 7/10; G06T 2207/20132
See application file for complete search history.

(56) References Cited

U.S. PATENT DOCUMENTS

| | | |
|---|---|---|
| 2007/0011114 A1 | 1/2007 | Chen et al. |
| 2008/0126100 A1* | 5/2008 | Grost ............... G10L 15/26 704/275 |
| 2019/0095798 A1 | 3/2019 | Baker |

FOREIGN PATENT DOCUMENTS

| | | |
|---|---|---|
| JP | 2016-157426 A | 9/2016 |
| WO | WO 2018/175098 A1 | 9/2018 |
| WO | WO 2018/194960 A1 | 10/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |

(Continued)

OTHER PUBLICATIONS

Wen et al. "Learning structured sparsity in deep neural networks", NIPS, 2016, pp. 9.*

(Continued)

*Primary Examiner* — Li Wu Chang
(74) *Attorney, Agent, or Firm* — K&L Gates LLP (57) ABSTRACT

Computer-based systems and methods add extra terms to the objective function of machine learning systems (e.g., neural networks) in an ensemble for selected items of training data. This selective training is designed to penalize and decrease any tendency for two or more members of the ensemble to make the same mistake on any item of training data, which should result in improved performance of the ensemble in operation.

17 Claims, 6 Drawing Sheets

(56) References Cited

FOREIGN PATENT DOCUMENTS

| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

Zhou et al. "Less is more: Towards compact CNNs", ECCV, 2016, pp. 16.*
Chan et al. Fast Neural Network Ensemble Learning via Negative-Correlation Data Correction, IEEE NN, 2005, pp. 1707-1710.*
International Preliminary Report on Patentability for International Application No. PCT/US2018/039007 dated Dec. 31, 2019.
International Search Report and Written Opinion of the International Searching Authority for International Application No. PCT/US2018/039007 dated Sep. 20, 2018.
Brown, G. "Diversity in Neural Network Ensembles", The University of Birmingham, School of Computer Science, Jan. 2004, accessed at <URL: ftp://ftp.cs.bham.ac.uk/pub/authors/J.L.Wyatt/gxb_thesis.pdf, 122 pages.
Jin et al., "Neural Network Regularization and Ensembling Using Multi-objective Evolutionary Algorithms", Proc. 2004 Congress on Evolutionary Computation, Portland, OR, Jun. 2004, 8 pages.
Qiang et al., "Clustering-based selective neural network ensemble", Journal of Zhejiang University Science, 2005, 6A (5), pp. 387-392.

\* cited by examiner

SELECTIVE TRAINING FOR DECORRELATION OF ERRORS

PRIORITY CLAIM

The present application claim priority to U.S. provisional patent application Ser. No. 62/524,686, filed Jun. 26, 2017, with the same title and inventor as above, and which is incorporated herein by reference.

BACKGROUND

An ensemble of machine learning systems often provides significantly better performance than the individual machine learning systems that are members of the ensemble. When the individual members of the ensemble are weak, that is low-performance classifiers, the ensemble can provide much better performance if the individual members are trained to be relatively uncorrelated.

However, when the individual members of the ensemble are high performance classifiers, they are inherently highly correlated because they all get the same correct answer almost all the time. This type of correlation is, of course, desirable. However, correlation in the form of multiple members of the ensemble making the same error on a given data item is still undesirable.

SUMMARY

In one general aspect, the present invention is directed to computer-based systems and methods that improve the performance of machine learning systems. In particular, the systems and methods of the present invention add a penalty term to the objective function of machine learning systems (e.g., neural networks) for selected items of training data. This selective training is designed to penalize and decrease any tendency for two or more members of the ensemble to make the same mistake on any item of training data, which should result in improved performance of the ensemble in operation.

For example, in one embodiment, assume that an ensemble of machine-learning systems comprises $N>2$ ensemble members. During training of the ensemble, an item of training data can be detected on which the ensemble is within a threshold range of an erroneous determination (e.g., made an erroneous determination or is close to making an erroneous determination). A proper subset of n ensemble members, where $1<n<N$, can be selected for subsequent training on the item of training data. In the subsequent training, the penalty term is back propagated to at least one of, and up to n of, the n ensemble members. The proper set of n ensemble members are preferably selected on a criterion that estimates the likelihood of the n ensemble members contributing to a potential error by the ensemble, such as that the n ensemble members made an erroneous determination on the item of training data or are within a threshold margin of an erroneous determination. Back propagating the penalty term can comprise adding a training node to the ensemble, such that the training node is connected to the n ensemble members and contributes the penalty term to the at least one, and up to n, of the n ensemble members during the subsequent training only if the training node is activated above a threshold level. In other embodiments, the penalty term comprises a weighted penalty term for each of the n ensemble members, such that there are n weighted penalty terms and the n weighted penalty terms are different for each of the n ensemble members.

These and other benefits of the present invention will be apparent from the description that follows.

BRIEF DESCRIPTION OF THE FIGURES

Various embodiments are described herein by way of example in connection with the following figures, wherein.

DETAILED DESCRIPTION

Figure 1:
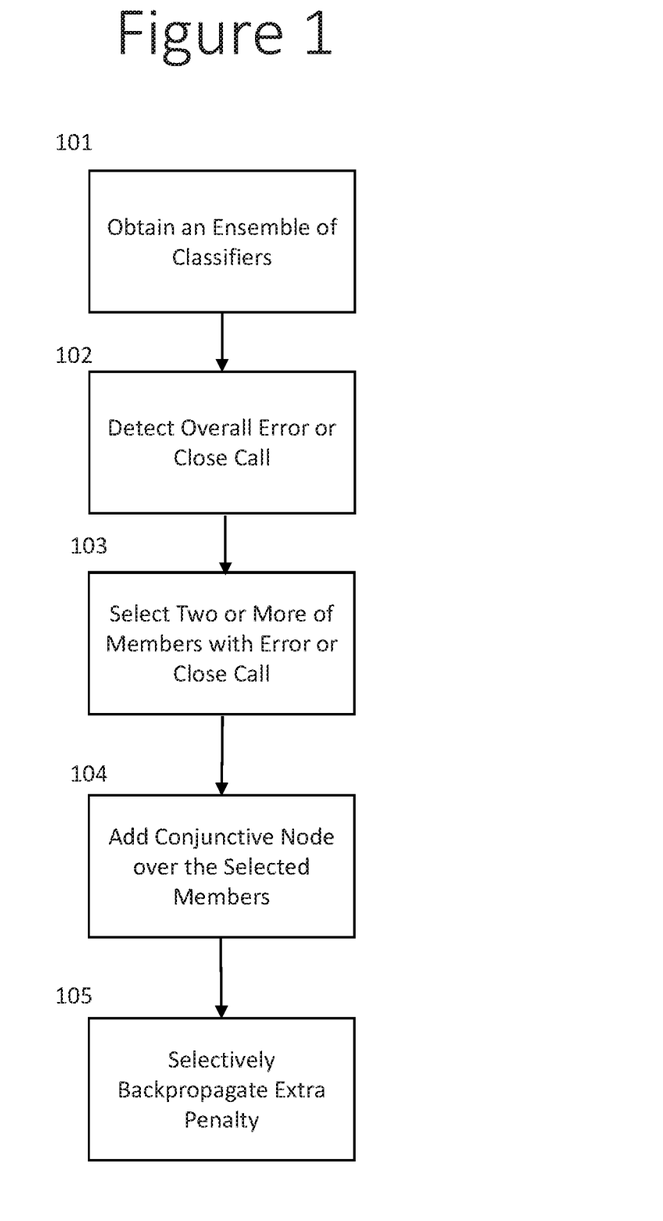
FIGS. 1 and 2 are flow charts of processes according to various illustrative embodiments of the present invention.

FIG. 1 is a flowchart of an illustrative embodiment to this invention. In this illustrative embodiment, during training of an ensemble of machine learning systems, an extra term is added to the objective function for selected items of training data. This selective training is designed to penalize and decrease any tendency for two or more members of the ensemble to make the same mistake on any item of training data.

Figure 2:
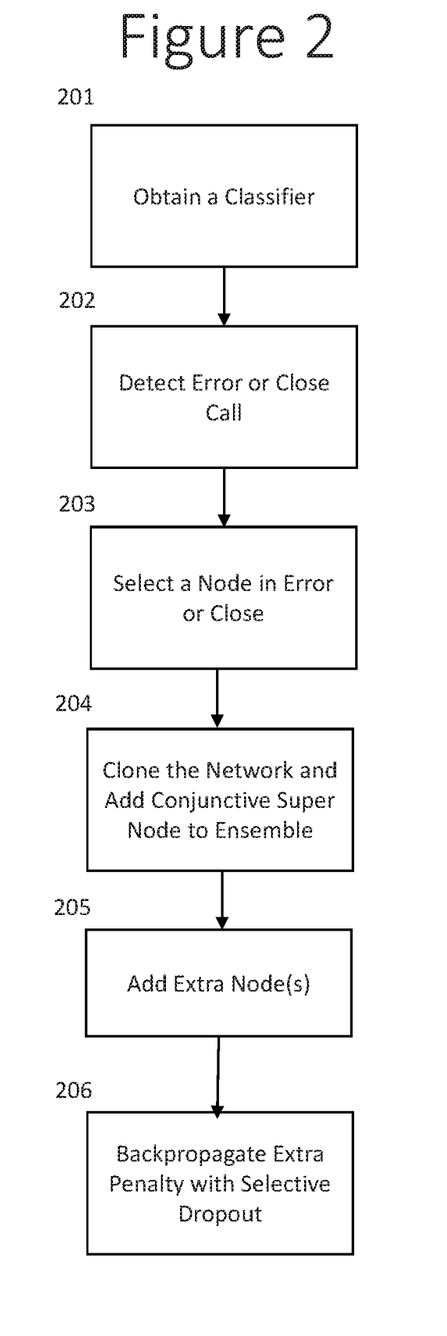

The illustrated process begins at Block 101, where a starting point of the process assumes an ensemble of machine-learned classifiers. There are many ways of creating an ensemble of classifiers that are well known to those skilled in the art of machine learning. By way of example, FIG. 2 illustrates a method of building an ensemble of classifiers from a single classifier using embodiments of the techniques of selective decorrelation described herein.

Referring back to FIG. 1, Block 102 detects an item of training data on which the ensemble makes an error or is close to an error; that is, the ensemble's final classification is within an error range. There are several ways by which the classification scores from individual members of an ensemble may be combined to make a combined classification decision. For example, consider an embodiment in which a score is computed by each member of the ensemble, for each classification category. For example, if the member classifiers are neural networks, the score for a classification category is the activation level of the corresponding output node of the network. The activation level $a_j$ of such an output node may be a sigmoid function of the sum of the inputs to the node:

$$z_j = \Sigma_i w_{i,j} a_i; a_j = \sigma(z_j) = 1/(1+\exp(-z_j))$$

As another example, the activation of each output node may be a softmax function normalized over the set of output nodes:

$$a_j = \exp(z_j)/\Sigma_i \exp(-z_j)$$

Then for each type of activation function or other scoring method, there are several methods for combining the scores. For example, the combined score for a category can be a type of average of the activations of the category across the members of the ensemble, such as the geometric mean or the arithmetic mean of the activations of the category. Other functions could also be used to combine the scores, such as a voting algorithm. For example, each member of the ensemble can be viewed as giving one vote to the category that has the highest score or activation. Then the combined decision is the category with the most votes, even if the number of votes is less than a majority. No matter which technique is used to combine the scores, the ensemble makes a single choice as the classification category. In the illustrative embodiment, there is a single correct answer, so any other category is an error.

For each method of making a combined decision, there can be several methods for deciding if there has been a close call; i.e., deciding whether the final classification category is within an error range. For example, a system can designate as a close call any item on which the score of the best scoring category is below some specified value. As another example, a system can designate as a close call any item on which the second best score is closer to the best score than some specified margin. As a further example, a system can designate as a close call any item on which the number of members of the ensemble with incorrect answers is within some margin of the number of ensemble members with the correct answer.

Whatever the method for determining close calls, block 102 of the illustrative embodiment selects some of or all the data items on which there is an error or close call for use in selective training.

For each selected training item, Block 103 selects two or more ensemble members for anti-error-correlation training. In one illustrative embodiment, the two or more selected ensemble members all have the same incorrect answer as their best scoring answer. In one embodiment, if no two members of the ensemble have the same incorrect answer on this item of training data, then this item of training data is not used for anti-error-correlation training and another item is selected.

Figure 5:
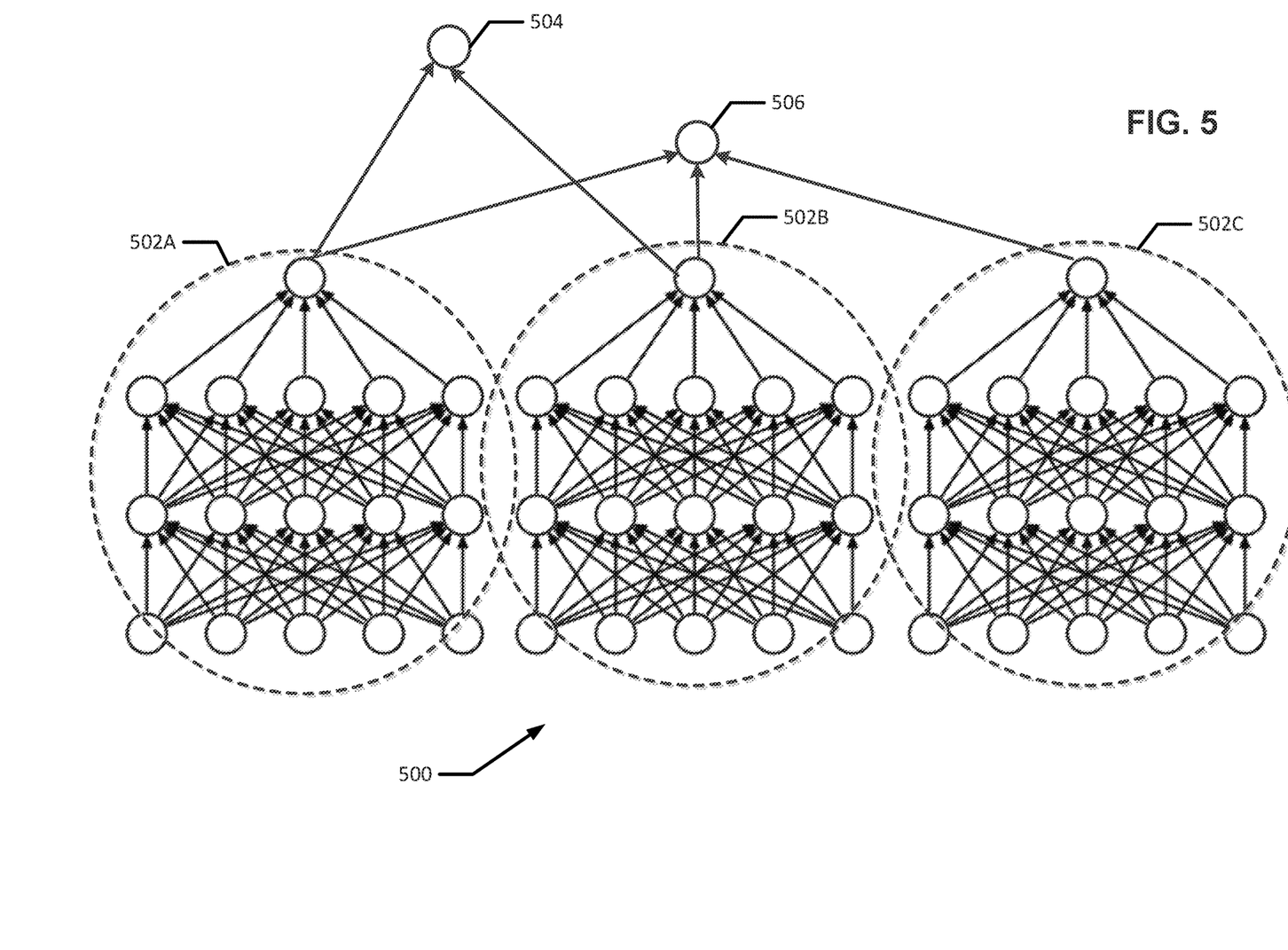
FIG. 5 is a diagram of an ensemble with a training node for selective training of the ensemble member according to various embodiments of the present inventing.

Block 104 adds an extra node (a "training node") above or outside the ensemble. The terminology in this discussion comes from neural networks classifiers. However, this invention applies to an ensemble of any type of machine learning system that optimizes an objective function, such as a cost of error function that is to be minimized. In the case of neural networks, the training node is like a node in a layer above the output layer. An example is shown in FIG. 5. The ensemble 500 comprises a number of neural networks as separate ensemble member; in this example, there are three ensemble members 502A-C for purposes of illustration. Of course in other embodiments there could be, and likely will be, a greater number of ensemble members. The training node 504 is separate from the output layer node(s) 506 of the ensemble 500.

The training node participates selectively in subsequent training of the ensemble. In a preferred embodiment, the weights and bias to the training node are "hyperparameters" rather than learned parameters, meaning that rather than being trained they are specified by a designer of the system or can be determined automatically, such as by a machine-learning-based learning coach, as described further below. In this embodiment, the training node 504 contributes an extra penalty term to the objective function only if the training node 504 is activated above its threshold value, and the nodes connected to the training node 504 correspond to a category that is incorrect for the current data item. If there are only two connected nodes, which is the case in the simple example of FIG. 5, with the output nodes of ensemble members 504A, 504B being connected to the training node 504, then preferably the weights and bias for the training node 504 compute an approximation to the AND function. For example, the weights can be each equal to one and the threshold can be 1.5. Then if the connected nodes have activations averaging more than 0.75, the training node will be activated.

Some embodiments may have more than two nodes connected to the training node. In this case, the weights and bias for the training node may implement a function that activates the training node only when the number of connected nodes with wrong answers exceeds some threshold number. However, some embodiments of this invention only use training nodes that connect two ensemble members. In these embodiments, any set with more than two incorrect nodes receives selective penalty terms from any of the training nodes whose two members are both in the set of incorrect nodes with the same wrong answer.

In subsequent training, when a training node created in Block 104 is activated, in some embodiments, Block 105 is further selective in the back propagation of the extra penalty term to the ensemble members from which it receives input. For any one selected item of training, the training node selects a subset of the contributing ensemble members to receive the extra penalty term. Preferably, each contributing member is selected for at least some of the selected training items, so each contributing member is penalized for making the same mistake at the same time as other ensemble members. However, each contributing member receives its penalties on a different set of selected data. Thus, the corrective training will tend to correct each contributing member to train in a different direction, increasing their tendency to not make the same mistake. For example, with reference to the simple embodiment shown in FIG. 5, the first ensemble member 502A could be selected for some training items where the training node 504 is activated, to the exclusion of the second ensemble member 502B, and the second ensemble member 502B could be selected for other training items where the training node 504 is activated, to the exclusion of the second ensemble member 502A.

In another example embodiment, each contributing member receives a weighted penalty, but the penalty weight is different for each contributing member for any one selected item and the set of weights are different for each selected item of training data. For example, if the training node is connected to two ensemble members, for a first item of training data, the penalty weight for the first of the two ensemble members could be 0.60 and the penalty weight for the second of the two ensemble members could be 0.40. For a subsequent training item where the training node is activated, the weights could be 0.65 and 0.35, respectively; or they could be 0.40 and 0.60 (i.e., the second ensemble gets the greater penalty weight). In these examples, the sum of the penalty weights is 1.00, but in other embodiments the sum of the penalty weight could equal a different number that is less than or greater than 1.00.

In another embodiment, the weighted penalty terms include coefficients that have a value of either zero or one, but not all of the weights are the same across the ensemble members. That is, at least one ensemble member connected to the training node has a weight of zero and at least one ensemble member connected to the training nodes was a weight of one.

Different techniques may be used to select the contributing ensemble members to backpropagate the extra penalty at step 105. In one embodiment, where multiple contributing ensemble members had the same wrong answer on a given training item, the training node may randomly choose which of the contributing ensemble members to penalize. In another embodiment, the training node may always penalize the contributing ensemble member that has the highest activation on the current data item. In yet other embodiments, the training node may use the opposite rule and only penalize the member that has the lower activation on the grounds that the member with the lowest activation needs the least improvement to get to a condition in which it no longer makes the same error. For each of these embodiments, each of the members may get penalized on some of the selected data, so that each member is penalized for the situation of making the same mistake. However, by being penalized on different data or by being penalized with different weights on each item, the ensemble members learn to make different corrections. In some embodiments, the assignment of which member to penalize for a given item of training data is made permanent—that is when the same item of training data is encountered again in another epoch, the penalty is assigned to the same member as before, and with the same weight as before if the penalties are weighted. In other embodiments, the decision is made separately in each epoch. In still other embodiments, there is a gradual transition from a fixed decision to an independent one. All these alternatives are under control of hyperparameters that may be optimized for a given application.

The extra selective training nodes are present only during training. They generally are not present when the trained network is used in operation. However, in an illustrative embodiment, they are present for adaptive training during operation, but do not participate in the operational classification computation.

FIG. 2 shows a flow chart of an illustrative embodiment of a process according to embodiments of the present invention by which a single network may be grown into an ensemble or, if starting with an ensemble (as opposed to a single network) to create additional members for the ensemble. The procedure shown in FIG. 2 is similar to the procedure shown in FIG. 1.

At Block 201 the process is assumed to start with an initial classifier, which could be single network or an ensemble. Block 202 detects an item of training data with an error or close call in the initial classifier. Block 203 selects at least one node in the initial classifier with an incorrect answer or close call on that item of training data.

In the case where the initial classifier is a single network, Block 204 clones the network to make a two-member ensemble or, in the case where the initial classifier is itself an ensemble, it selects one or more members of the ensemble with an incorrect answer or close call for the node selected at Block 203 and clones the selected members of the ensemble to add additional members. Then, like block 104 in FIG. 1, Block 205 then adds the training node above the ensemble with input from the two or more copies of the selected node.

Block 206 then preferably controls subsequent training in a manner similar to block 105 of FIG. 1, to train the two or more ensemble members to be different from each other.

In some embodiments, Block 203 can select more than one node. The process described in this paragraph is similar to the process described in the preceding paragraphs, except applied to such an embodiment in which Block 203 selects more than one node. In some embodiments, only one clone is created at Block 204, with each of the selected nodes having one copy in each of the two networks, and such that each selected node and its clone are connected by an extra selective training node, which is added by Block 205 and used to control the selective back propagation in Block 206. In such embodiments, there are more nodes that are being selectively trained to create greater differences between the two new networks. In addition, other well-known techniques can be used to make the ensemble members learn to be different and to enhance the overall performance of the ensemble.

Figure 3A:
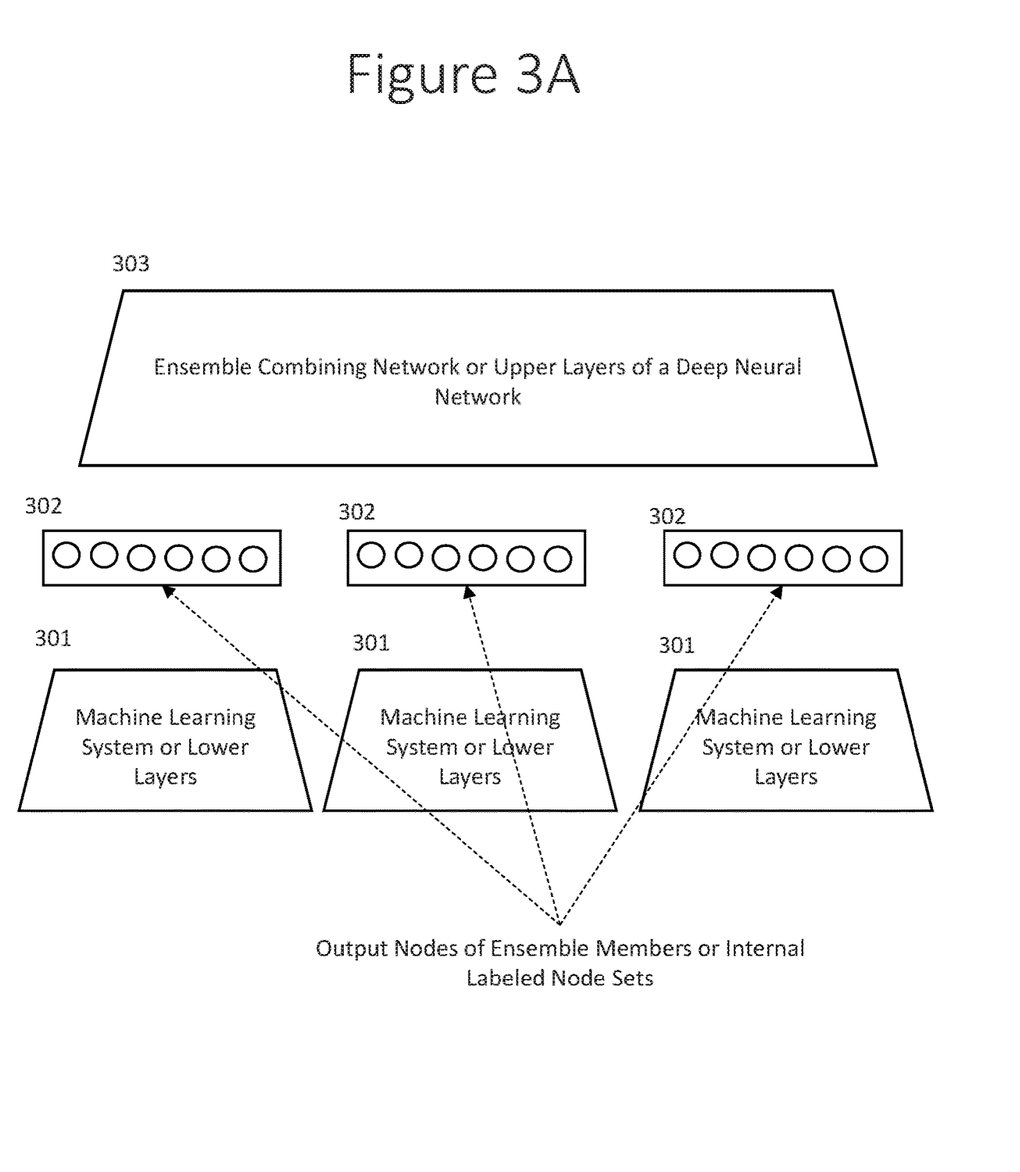
FIGS. 3a and 3b are block diagrams of a form of network used in various embodiments of the present invention.

FIG. 3a illustrates an embodiment of this invention in which an ensemble of neural networks has been turned into a single network by adding a combining network above the ensemble members. In the illustrative embodiment, the combining network 303 is a neural network. A combining network as shown in FIG. 3a can be used even when the ensemble members 301 are some form of machine learning system other than neural networks. The nodes 302 are the respective output nodes of the ensemble members 301. As internal nodes in the combined network, they have a special property. They are "labeled nodes" as defined herein. As labeled nodes, in addition to the regular backpropagation, in some embodiments, they can have local backpropagation, as described in the next paragraph.

FIG. 3a also illustrates such a network structure resulting from a single network with multiple labeled node sets in internal layers. A labeled node set can be created, for example, by copying a full network, including output nodes, as a subnetwork into a larger single network. In an illustrative embodiment, subsequent training of the large network does backpropagation that includes a local backpropagation that is generated at each former output node just as with a regular output node, with this locally generated backpropagation added as an extra term to the backpropagation from the upper network. A hyperparameter can control the relative weighting of the local backpropagation compared to the backpropagation from the upper network. In an illustrative embodiment, this combined backpropagation training can also be used with a single network combining an ensemble as illustrated in FIG. 3a.

In some embodiments, labeled node sets can have labels that are different from the category labels for the output of the large containing network. In other embodiments, local labeled node sets with either the same labels as the output of the containing network or some other set of labels can be used for other purposes, such as regularization, whether they are configured as an ensemble-like collection of subnetworks or not.

Adding a combining network to an ensemble as in the illustrative embodiment of FIG. 3a has several advantages. First, the combining network can be initialized to imitate any of the standard ensemble combining methods. Then the combining network can be trained by stochastic gradient descent potentially to provide even better combined performance. In addition, backpropagation from the combining network can reinforce any selective decorrelation that has improved overall performance. In any case, the combined network can imitate any computation that can be done by the non-combined ensemble.

Figure 3B:
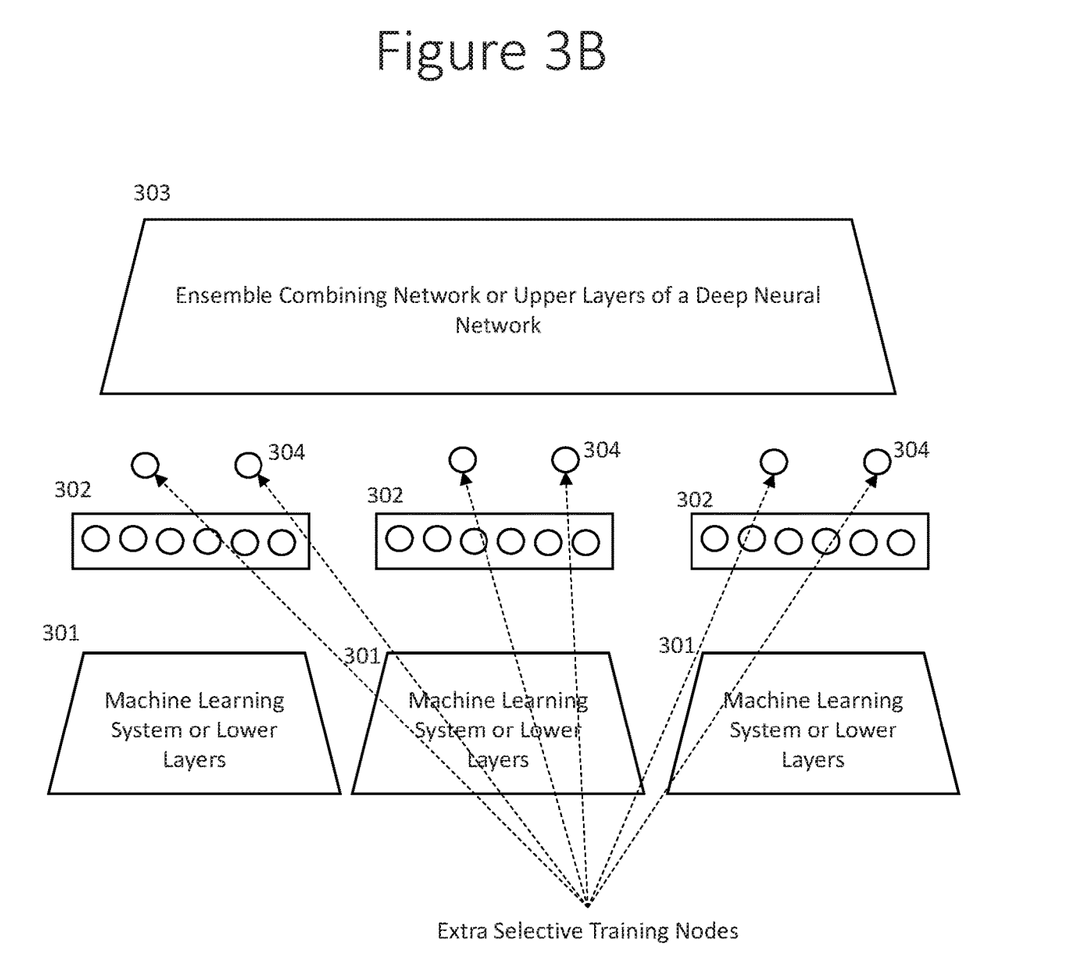

In an illustrative embodiment, the selective decorrelation training as discussed in association with blocks 103, 104 and 105 of FIG. 1 can also be applied to a single network formed from an ensemble, as illustrated in FIG. 3a, or, equivalently, to a single network that is trained to have an ensemble-like subnetwork with labeled node sets. The extra training nodes 304 can be inserted between the labeled nodes set and the combining network, as shown in FIG. 3b. Each extra training node 304 is connected to a set of nodes with one node from each of two or more labeled node sets. The nodes connected to any extra selective training node must have corresponding labels. Penalty terms from selective training can be locally added to the backpropagation from the combining network above. Selective training proceeds as described in association with block 105 of FIG. 1.

The example processes illustrated in FIGS. 1 and 2 can be implemented with an appropriately programmed computer system. As such, the computer system may be implemented with one or a number of networked computer devices that are programmed to perform the processes shown in FIG. 1 or 2. The computer device(s) may include one or more processor cores and memory for storing computer instructions (e.g., software) that are executed by the processor(s). Each processor may comprise one or multiple cores, such as CPU, GPU or AI accelerator processing cores. The software that programs the processor(s) may be stored in RAM and/or ROM of the computer devices.

Figure 4:
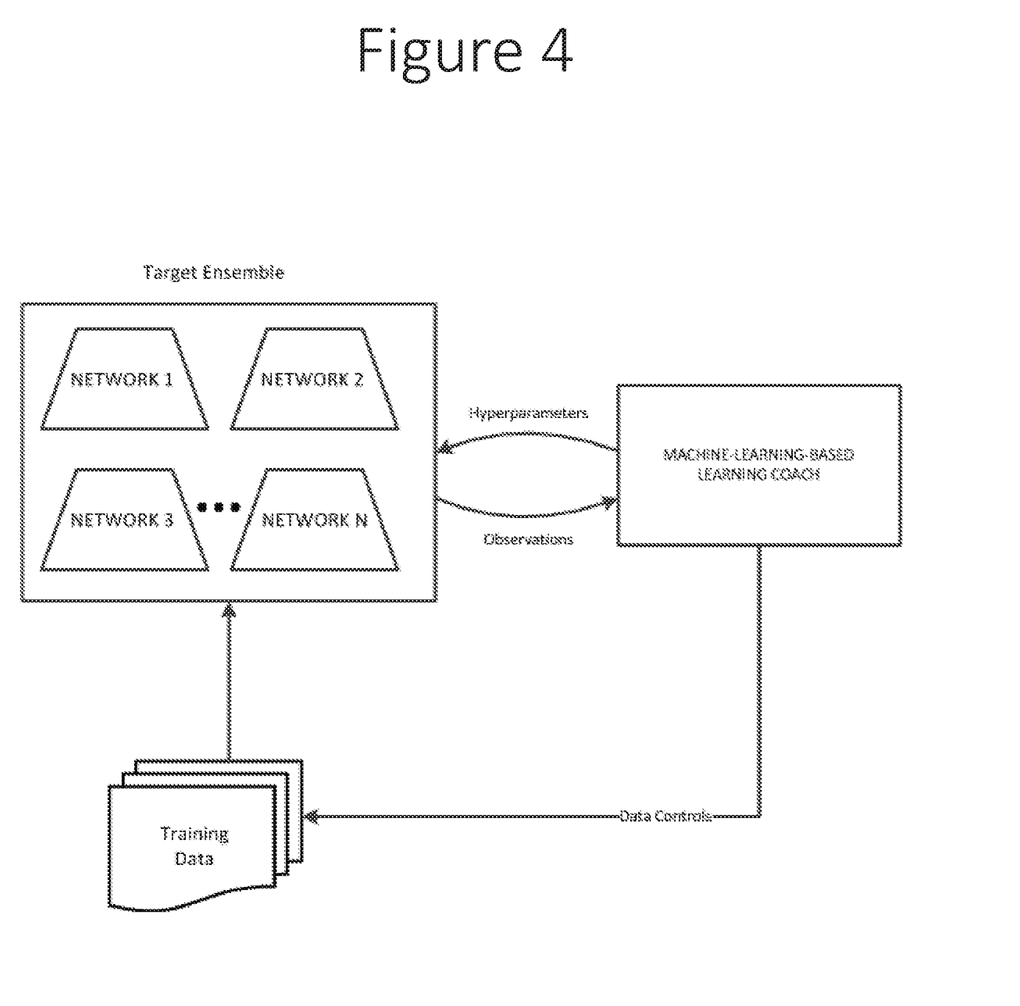
FIG. 4 is a block diagram of a computer system for performing the processes shown in FIGS. 1 and 2, and otherwise described herein, according to various embodiments of the present invention.

In particular, the processes of FIG. 1 or 2 could be implemented with a machine learning system that guides the training of the "target" ensemble of machine learning systems, as shown in the example of FIG. 4. The example computer system 400 of FIG. 4 comprises two computer systems: a first system 402 for implementing the target ensemble (e.g., ensemble members 301 and ensemble combining network of FIGS. 3A-B) and a machine-learning (ML) learning coach 404. The first system 402 trains and validates the ensemble member networks of the target ensemble using machine learning techniques.

The learning coach 404 can itself be a machine learning system that aids the training of the networks of the target ensemble based on observations from the target ensemble networks. In particular, the learning coach 404 can machine-learn the hyperparameters for the networks of the target ensemble that control the growth and training of the target ensemble networks. For example, corresponding to step 102 of FIG. 1, the learning coach 404 can determine the closeness of the calls by the ensemble networks based on the observed activation levels of the networks' nodes and, based thereon, select items of training data for which there are close calls for use in the selective training. The learning coach 404 could also select the members of the ensemble for the selective training at step 103, as well as determine the weights and bias for the training nodes added at step 104. The back propagation at step 105 could be performed by the target ensemble computer system 402, but with the training node weights and bias determined by the learning coach, and with the learning coach's selection of the ensemble member(s) that receive the back propagation penalty.

More details about an exemplary machine-learning-based learning coach are provided in published PCT application WO 2018/063840, entitled "Learning Coach for Machine Learning System," by inventor James K. Baker, published Apr. 5, 2018 and PCT application PCT/US18/20887, also entitled "Learning Coach for Machine Learning System," by inventor James K. Baker, filed Mar. 5, 2018, both of which are incorporated herein by reference in its entirety. As described generally in these incorporated applications, the learning coach may itself be a machine-learning system but it does not try to recognize the patterns or make the classifications that the ensemble members are learning to recognize or make. Instead, the data processed by the learning coach 404 may include observations of the internal states of the ensemble members and data that the ensemble members compute during training. By monitoring the student learning system, the coach machine learning system can learn (through machine learning techniques) hyperparameters for the ensemble members, such as which ensemble member(s) to select for the back propagation penalty and the weights/bias for the training node to meet a defined objective.

The learning coach 404 and target ensemble system 402 may communicate via a high-speed data bus. Further, to improve processing speeds, each may be implemented with their own set of processor cores. For example, the target ensemble system 402 may be implemented with a first set of processor cores (e.g., CPU, GPU and/or AI accelerator cores) and the learning coach 404 may be implemented with a second set of processor cores (e.g., CPU, GPU and/or AI accelerator cores). In addition, either or both of the computer systems 402, 404 could be implemented by a single computer system (e.g., a server) or by a distributed network of computer systems (e.g., servers).

In other embodiments, a non-machine learning computer system may execute the processes of FIGS. 1 and 2. That is, a computer system that executes static programming instructions may control the growth and training of the ensemble members according to the processes shown in FIGS. 1 and 2.

Based on the above description, it is clear that embodiments of the present invention can be used to improve many different types of machine learning systems, particularly ensembles of neural networks, in a variety of applications. For example, embodiments of the present invention can improve recommender systems, speech recognition systems, and classification systems, including image and diagnostic classification systems, to name but a few examples, such as by decreasing any tendency for two or more members of the ensemble to make the same mistake on any item of training data, which should result in improved performance in operation (i.e., when the ensemble is used to make classifications, recommendations, etc.).

The computer systems for the learning coach and the ensemble members can be implemented with computer hardware and software. For example, they could be part of an integrated computer system (e.g., a server or network of servers) that has multiple processing CPU cores. The program instructions could be stored in computer memory that is accessible by the processing cores, such as RAM, ROM, processor registers or processor cache, for example. In other embodiments, the processor(s) may comprise graphical processing unit (GPU) cores, e.g. a general-purpose GPU (GPGPU) pipeline, or processing cores of an AI accelerator chip(s) (ASIC(s)). GPU cores operate in parallel and, hence, can typically process data more efficiently that a collection of CPU cores, but all the cores execute the same code at one time. AI accelerators are a class of microprocessor designed to accelerate artificial neural networks. They typically are employed as a co-processor in a device with a host CPU as well. An AI accelerator typically has tens of thousands of matrix multiplier units that operate at lower precision than a CPU core, such as 8-bit precision in an AI accelerator versus 64-bit precision in a CPU core. In other embodiments, the computer systems could be part of a distributed computer system. For example, the computer devices (e.g., servers) that implement the learning coach may be remote from the computer systems for the ensemble members, and interconnected by data networks, such as a LAN, WAN, the Internet, etc., using suitable wired and/or wireless data communication links. Data may be shared between the various systems using suitable data links, such as data buses (preferably high-speed data buses) or network links (e.g., Ethernet).

The software for the various compute systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer systems and computer-implemented methods of training an ensemble of machine-learning systems, where the ensemble comprises N>2 ensemble member. In various embodiments, the method comprises, during training of the ensemble, detecting an item of training data on which the ensemble is within a threshold range of an erroneous determination. The method also comprises the step of selecting n ensemble members for subsequent training on the item of training data, where 1<n<N. The method further comprises the step of back propagating a penalty term to an objective function for training the ensemble to at least one and up to n of the n ensemble members during the subsequent training of the ensemble.

In various embodiments, a computer system according to the present invention comprises one or more processor cores and computer memory in communication with the one or more processor cores. The computer memory stores software that, when executed by the one or more processor cores, cause the one or more processor cores to: (i) during training of the ensemble, detect an item of training data on which the ensemble is within an threshold range of an erroneous determination; (ii) select n ensemble members for subsequent training on the item of training data, where 1<n<N; and (iii) back propagate a penalty term to an objective function for training the ensemble to at least one and up to n of the n ensemble members during the subsequent training of the ensemble.

In various implementations, the n ensemble members may be selected based on a criterion that estimates the likelihood of the n ensemble members contributing to a potential error by the ensemble. The criterion may be that the n ensemble members make an erroneous determination on the item of training data or are within a threshold margin of an erroneous determination. In addition, the penalty term may comprise a weighted penalty term for each of the n ensemble members during the subsequent training, such that there are n weighted penalty terms and wherein the n weighted penalty terms are different for each of the n ensemble members. Also, each of the n weighted penalty terms may include a coefficient that is either zero or one, and not all the n weight penalty terms have the same coefficient value.

In various implementations, the method may further comprise back propagating, by the one or more processors cores, a penalty term to an objective function for training the ensemble to at least one and up to n of the n ensemble members during the subsequent training. Back propagating the penalty term may comprise adding a training node to the ensemble, such that the training node is connected to the n ensemble members and contributes the penalty term to the at least one and up to n of the n ensemble members during the subsequent training only if the training node is activated above a threshold level. The raining node may contribute a weighted penalty term to each of then ensemble members during the subsequent training only if the training node is activated above a threshold level, wherein the weighted penalty terms are different for each of the n ensemble members each time the training node is activated. For example, weights and bias for the training node may implement an activation function that activates the training node only when the number of connected ensemble members with erroneous answers exceeds a threshold number. Also, the training node may be ignored during operational classification by the ensemble.

In various implementations, detecting the item of training data on which the ensemble is within an threshold range of an erroneous determination comprises detecting an item of training data where the number of ensemble members with incorrect classifications is within a threshold margin of the number of ensemble members with correct classifications. For example, in various implementations, each ensemble member is a classifier and the ensemble combines outputs from the ensemble members to make a final category classification. In those cases, detecting the item of training data on which the ensemble is within an threshold range of an erroneous determination can comprise detecting an item of training data on which a score of a best scoring category by the ensemble is below a specified value or detecting an item of training data on which a score of a second highest scoring classification category by the ensemble is within a threshold margin of a score of a highest scoring classification category.

In various implementations, selecting may comprise, whenever the training node is activated: (i) randomly selecting the at least 1 and up to n of the connected ensemble member to receive the extra penalty term in the back propagation; (ii) selecting the ensemble member of the n ensemble members that has a highest activation on a current training data item during the back propagation; or (iii) selecting the ensemble member of the n ensemble members that has a lowest activation on a current training data item during the back propagation.

The method may further comprise, prior to detecting an item of training data on which the ensemble is within a threshold range of an erroneous determination, generating the ensemble from a single, original machine learning system. Generating the ensemble may comprise: (i) generating a duplicate machine learning system of the original machine learning system to generate an ensemble comprising the original machine learning system and the duplicate machine learning system; and (ii) adding the training node such that it is connected to a selected node in the original machine learning system and the duplicate node in the duplicate machine learning system of the selected node in the original machine learning system.

In various implementations, the method further comprises adding a combining network to the ensemble to combine outputs from the N ensemble members. The output nodes of the N ensemble members may be labeled nodes in an internal layer of the ensemble with the combining network. At least some of the labeled nodes may have labels that are different from category labels of the ensemble with the combining network. Also, adding the training node may comprise adding the training node between the outputs of the n ensemble members and the combining network. In particular, adding a training node to the ensemble may comprise adding a plurality of training nodes to the ensemble, such that each training node is connected between the outputs of the N ensemble members and the combining network. During back propagation in subsequent training of the ensemble, with the added training nodes, whenever one of the training nodes is activated, at least 1 ensemble member is selected to receive the extra penalty term in the back propagation.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A method of training an ensemble of machine-learning systems, wherein the ensemble comprises N>2 ensemble members, wherein each ensemble member is a classifier, and wherein the ensemble combines outputs from the ensemble members to make a final category classification, the method comprising:
during training of the ensemble, detecting an item of training data on which the ensemble is within an threshold range of an erroneous determination by detecting an item of training data on which a score of a second highest scoring classification category by the ensemble is within a threshold margin of a score of a highest scoring classification category;
selecting n ensemble members for subsequent training on the item of training data, where 1<n<N; and
back propagating a penalty term to an objective function for training the ensemble to at least one and up to n of the n ensemble members during the subsequent training of the ensemble.

2. The method of claim 1, further comprising adding a combining network to the ensemble to combine the outputs from the N ensemble members.

3. A computer system for training an ensemble of machine-learning classifiers, wherein the ensemble comprises N>2 ensemble members, and each ensemble member comprises a machine-leaning classifier, and the ensemble combines outputs from the ensemble members to make a final category classification, the computer system comprising:
one or more processor cores; and
computer memory in communication with the one or more processor cores, wherein the computer memory stores software that, when executed by the one or more processor cores, cause the one or more processor cores to:
during training of the ensemble, detect an item of training data on which the ensemble is within an threshold range of an erroneous determination by detecting an item of training data on which a score of a second highest scoring classification category by the ensemble is within a threshold margin of a score of a highest scoring classification category; and
select n ensemble members for subsequent training on the item of training data, where 1<n<N; and
back propagate a penalty term to an objective function for training the ensemble to at least one and up to n of the n ensemble members during the subsequent training of the ensemble.

4. The computer system of claim 3, wherein the one or more processor cores are programmed to select the n ensemble members by selecting the n ensemble members based on a criterion that estimates the likelihood of the n ensemble members contributing to a potential error by the ensemble.

5. The computer system of claim 3, wherein the penalty term comprises a weighted penalty term for each of the n ensemble members during the subsequent training, such that there are n weighted penalty terms and wherein the n weighted penalty terms are different for each of the n ensemble members.

6. The computer system of claim 5, wherein each of the n weighted penalty terms includes a coefficient that is either zero or one, and not all the n weight penalty terms have the same coefficient value.

7. The computer system of claim 3, wherein the criterion is that the n ensemble members make an erroneous determination on the item of training data or are within a threshold margin of an erroneous determination.

8. The computer system of claim 3, wherein the one or more processor cores are further programmed to back propagate a penalty term to an objective function for training the ensemble to at least one and up to n of the n ensemble members during the subsequent training.

9. The computer system of claim 8, wherein the one or more processor cores are programmed to back propagate the penalty term by adding a training node to the ensemble, such that the training node is connected to the n ensemble members and contributes the penalty term to the at least one and up to n of the n ensemble members during the subsequent training only if the training node is activated above a threshold level.

10. The computer system of claim 9, wherein the training node contributes a weighted penalty term to each of the n ensemble members during the subsequent training only if the training node is activated above a threshold level, wherein the weighted penalty terms are different for each of the n ensemble members each time the training node is activated.

11. The computer system of claim 9, wherein weights and bias for the training node implement an activation function that activates the training node only when the number of connected ensemble members with erroneous answers exceeds a threshold number.

12. The computer system of claim 9, the training node is ignored during operational classification by the ensemble.

13. The computer system of claim 3, wherein each of the N ensemble members comprises a neural network.

14. The computer system of claim 3, wherein the one or more processor cores are further programmed to, prior to detecting an item of training data on which the ensemble is within an threshold range of an erroneous determination, generate the ensemble from a single, original machine learning system.

15. The computer system of claim 3, wherein the one or more processor cores are further programmed to add a combining network to the ensemble to combine the outputs from the N ensemble members.

16. A computer system for training an ensemble of machine-learning classifiers, wherein the ensemble comprises N>2 ensemble members, and each ensemble member comprises a machine-leaning classifier, the computer system comprising:
one or more processor cores; and
computer memory in communication with the one or more processor cores, wherein the computer memory stores software that, when executed by the one or more processor cores, cause the one or more processor cores to:

during training of the ensemble, detect an item of training data on which the ensemble is within an threshold range of an erroneous determination by detecting an item of training data where the number of ensemble members with incorrect classifications is within a threshold margin of the number of ensemble members with correct classifications; and select n ensemble members for subsequent training on the item of training data, where $1<n<N$; and back propagate a penalty term to an objective function for training the ensemble to at least one and up to n of the n ensemble members during the subsequent training of the ensemble.

17. A method of training an ensemble of machine-learning systems, wherein the ensemble comprises $N>2$ ensemble members and wherein each ensemble member is a classifier, the method comprising:

during training of the ensemble, detecting an item of training data on which the ensemble is within an threshold range of an erroneous determination by detecting an item of training data where the number of ensemble members with incorrect classifications is within a threshold margin of the number of ensemble members with correct classifications;

selecting n ensemble members for subsequent training on the item of training data, where $1<n<N$; and back propagating a penalty term to an objective function for training the ensemble to at least one and up to n of the n ensemble members during the subsequent training of the ensemble.

\* \* \* \* \*